United States Patent
Dan et al.

[11] Patent Number: 6,088,767
[45] Date of Patent: Jul. 11, 2000

[54] FILESERVER BUFFER MANAGER BASED ON FILE ACCESS OPERATION STATISTICS

[75] Inventors: Asit Dan, West Harrison; Dinkar Sitaram, Yorktown Heights; Philip Shi-lung Yu, Chappaqua, all of N.Y.

[73] Assignee: International Business Machines Corporation, Armonk, N.Y.

[21] Appl. No.: 08/055,422

[22] Filed: Apr. 30, 1993

[51] Int. Cl.[7] .................................................. G06F 12/12
[52] U.S. Cl. ............................ 711/129; 711/134; 707/1; 707/10; 707/205
[58] Field of Search ..................... 395/425, 600, 395/250, 460, 461; 711/117, 118, 119, 122, 129, 133, 134, 154, 159; 707/1, 10, 205

[56] References Cited

U.S. PATENT DOCUMENTS

| | | | |
|---|---|---|---|
| 3,702,006 | 10/1972 | Page | 395/650 |
| 4,422,145 | 12/1983 | Sacco et al. | 395/650 |
| 4,463,424 | 7/1984 | Mattson et al. | 395/425 |
| 4,509,119 | 4/1985 | Gumaer et al. | 395/250 |
| 4,542,458 | 9/1985 | Kitajima et al. | |
| 4,993,030 | 2/1991 | Krakaver et al. | 371/40.1 |
| 5,131,087 | 7/1992 | Warr | 395/425 |
| 5,142,670 | 8/1992 | Stone et al. | 395/425 |
| 5,305,389 | 4/1994 | Palmer | 382/1 |
| 5,325,505 | 6/1994 | Hoffecker et al. | 395/425 |

FOREIGN PATENT DOCUMENTS 2184267  6/1987  United Kingdom.

*Primary Examiner*—Paul V. Kulik
*Attorney, Agent, or Firm*—Ronald L. Drumheller

[57] ABSTRACT

Fileserver buffers are managed so as to improve the hit ratio for read accesses to the fileserver by clients by grouping related files into filesets, collecting fileserver access operation (i.e., read and write) statistics for each of the filesets, classifying the filesets into a plurality of fileset categories having similar collected access operation statistics and then implementing different fileserver buffer management policies for the blocks (or pages) from each of the different fileset categories. The buffer management policy applied to each of these categories is designed to create a generally higher preference for retaining blocks (or pages) of files in the fileserver buffers having a generally higher read to write ratio.

9 Claims, 5 Drawing Sheets

FIG. 3

| FILESET ID | BUFFER POOL ID | READ RATIO | READ COUNT | WRITE COUNT |
|---|---|---|---|---|
|  |  |  |  |  |
| $F_i$ | $BP_i$ | $rr_i$ | $rc_i$ | $wc_i$ |
|  |  | ⋮ |  |  |
|  |  |  |  |  |

312 → (row with $F_i$, $BP_i$, $rr_i$, $rc_i$, $wc_i$)

310 → (table)

FILESERVER BUFFER MANAGER BASED ON FILE ACCESS OPERATION STATISTICS

DESCRIPTION

1. Field of the Invention

This invention generally relates to electronic computer systems having one or more fileserver subsystems and more particularly to management of the fileserver temporary storage (i.e., buffers). It pertains not only to such fileserver buffers that may be managed by software (e.g., a normal memory cache in a fileserver) but also to such buffers that may be managed by hardware (e.g., a cache in a controller of a disk storage unit attached to a fileserver). More specifically this invention relates to management of the highest (i.e., fastest) level of fileserver temporary storage in a client-server environment.

2. Background of the Invention

Fileservers are computer systems that store user program and data files. They are normally connected to a computer network that allows users (i.e., clients) to access the files over the network. Such an environment is generally called a client-server environment.

In general, fileservers use disks to store files. The time taken to access or update the data on the disk becomes a significant component of the overall fileserver performance. In order to improve performance, fileservers typically keep some portions of some files (and/or some complete files) in memory buffers in the fileserver system (herein referred to as the "fileserver buffers"). These fileserver buffers include not only those buffers that may be in the main memory of the fileserver computer system but also those buffers that may exist in the disk drives or other hardware components in the computer system. The schemes and mechanisms used by the fileserver to decide which data to store in the fileserver buffers are herein generally referred to as the fileserver buffer management policies. In general, it is desirable to adopt fileserver buffer management policies which maximize the probability that files (and/or portions of files) desired by a client from a fileserver will be found in the highest level (and therefore fastest) buffers of that fileserver.

The clients in a client-server environment may also keep full or partial copies of the files they are accessing in buffers in their own local computer system or in some intermediate computer system (herein generally called the "client buffers"). The client buffers have the impact of eliminating (i.e., filtering out) accesses to the fileserver system for client file accesses that can be satisfied instead from the client buffers. Because of this, the buffer management algorithms used in a client-server environment ideally should be different from the buffer management algorithms normally used in traditional environments, though heretofore this has not been done.

The most common buffer management policy currently in use in traditional environments (and in client-server environments as well) is the Least Recently Used (LRU) algorithm. If the fileserver buffer is large enough to hold B blocks and the LRU buffer management policy is used by the fileserver, the most recently referenced B blocks are kept in the fileserver buffer. The clock algorithm is another commonly used algorithm, which discards blocks that are referenced less frequently than once in some predetermined time interval.

Neither of these known algorithms or their variants are designed particularly for a client-server environment and hence do not exploit the special properties of such an environment. In the client-server environment, a client makes a read request for a page (or block) from the fileserver only if it is not found in its local buffer. Consequently, the client buffer tends to filter out the read requests to the private files of a user. This is because these files tend to be referenced very often and hence are found in the client buffers. However, a large number of updates to these files are still propagated to the fileserver for permanent safe storage against loss, where they are routinely retained in the fileserver buffers by the LRU and clock algorithms, even though it is unlikely that the client will be requesting these files soon rather than updating them again. So it is not very useful to cache these files in a buffer at the fileserver. In contrast, the read-only files tend to be shared by a large number of clients, and hence, it is more useful to cache these files in the fileserver buffers, even if they are read less frequently than client files are updated.

In "Load Balancing in a Multi-server Environment by Distributing Operations on Mostly-Read Filesets over the Servers," IBM Technical Disclosure Bulletin, Vol. 34, No. 11 (April 1992) at pp. 146–147, the inventors of this invention recognized that mostly-read and read-write files have different access characteristics in a client-server environment and proposed to balance the load over multiple fileservers by distributing access operations over the fileservers only with respect to the read-mostly files. However, nothing is suggested with respect to improving buffer management at the fileservers.

SUMMARY OF THE INVENTION

It is an object of this invention to provide an efficient fileserver buffer manager for the client-server environment.

It is also an object to provide a buffer management policy for a fileserver which results in a higher hit-ratio on read accesses to the fileserver than with conventional buffer management policies.

Another object is provide a fileserver buffer manager that gives blocks (or pages) of files that are read most of the time a higher preference for remaining in the fileserver buffers than blocks (or pages) of files that are updated frequently.

Still another object is to categorize files on the basis of access operation (i.e., read/write) statistics.

A further object is to provide separate buffer management policies for each such category of files.

It is also an object to implement such separate buffer management policies by effectively partitioning the highest storage level of a fileserver and effectively dedicating a partition to each such category of files.

These and further objects and features have been achieved by this invention by grouping related files into filesets, collecting fileserver access operation (i.e., read and write) statistics for each of the filesets, classifying the filesets into a plurality of fileset categories having similar collected access operation statistics and then implementing different fileserver buffer management policies for the blocks (or pages) from each of the different fileset categories. The buffer management policy applied to each of these categories is designed to create a generally higher preference for retaining blocks (or pages) of files in the fileserver buffers having a generally higher read-to-write ratio.

Preferably the number of read access operations and write access operations are collected for each fileset (over a predetermined period) and then a mapping function is used to assign filesets to categories in accordance with some predetermined function of the counts. In the preferred embodiment, the ratio of read accesses to total accesses (reads plus writes) is calculated for each fileset (herein sometimes called the read/write ratio and sometimes more simply called the read ratio). The range of read/write ratios from 0 to 1 is then subdivided and all the filesets having a read/write ratio in the same portion of the subdivided (i.e., partitioned) range are assigned to the same fileset category.

The highest range of read/write ratios corresponds to the fileset category that has access operation statistics which indicate that the files in this category are usually read and not often updated. A buffer management policy which favors retention of blocks (or pages) of such files in the fileserver buffer storage is applied to this category of filesets.

The category of filesets with a read/write ratio in the lowest range of read/write ratios corresponds to filesets that have access operation statistics which indicate that files in this category are often updated and not often read. A buffer management policy is applied to this category of filesets which favors replacement of blocks (or pages) of such files in the fileserver buffer storage.

A category of filesets with a read/write ratio in an intermediate range of read/write ratios (if any) corresponds to filesets that have access operation statistics which indicate that files in this category are sometimes updated and sometimes read. A buffer management policy is applied to such a category of filesets which is intermediate to the previously described two buffer management policies.

Buffer resources can be managed so that some fileset categories are more favored for retention in the buffer resources of the fileserver while other fileset categories are more favored for replacement in many different ways. In the preferred embodiment, the fileserver buffer resources are effectively divided into multiple buffer pools and each pool is used to store blocks (or pages) of files of a single fileset category. This automatically creates and implements a different buffer management policy for each fileset category, even when each of the buffer pools is managed using the same replacement algorithm, which is the case in the preferred embodiment, where it is assumed that the same LRU algorithm will be used to manage each buffer pool.

The fileset category with the lowest read/write ratios is then favored for replacement simply by making the buffer pool assigned to that fileset category suitably small with respect to the size of that fileset category (or more accurately with respect to the amount of activity experienced or expected for that fileset category), so replacement will occur frequently. In the limit, the buffer pool for the category most favored for replacement even could be eliminated entirely, making retention of files in that category in fileserver buffer storage not occur at all.

Conversely, the fileset category with the highest read/write ratio is favored for retention by making the buffer pool for that fileset category suitable large with respect to the size of that fileset category or amount of anticipated activity thereof.

Alternatively, even under an LRU policy applied to a single fileserver buffer pool, such a priority scheme could be achieved effectively by inserting blocks (or pages) into the LRU stack at a position determined by the priority. A block having a low priority for retention (as a result of the category of the fileset of that block) thus is effectively pre-aged by inserting it into the stack not at the top but rather near the bottom, so it will age out and be replaced much more quickly than if it had been inserted at or near the top of the stack.

Under a Generalized Clock policy used with a single fileserver buffer pool (e.g., as described in "Analysis of the Generalized Clock Buffer Replacement Scheme for Database Transaction Processing," *ACM SIGMETRICS Conference*, 1992 by V. Nicola, A. Dan and D. Dias), blocks in a fileset category with a lower priority could be given a lower value of initial weight.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 3 illustrates data structures which may be used for maintaining access operation statistics and an identifier for the currently assigned buffer pool for each fileset;

DETAILED DESCRIPTION OF A PREFERRED EMBODIMENT

In the following description, it is assumed that a client-server environment consists of multiple clients each with its own local buffer, and one or more servers to which the disks are attached. Each server also has a separate buffer. The updated blocks by all clients are propagated to the server buffer for eventual propagation to the disks. Each client requests a block from the appropriate server if it is not found in the local buffer of the client. The files are also assumed to be grouped into sets called filesets. The filesets may be predefined or alternatively each file may be considered a separate fileset.

Figure 1:
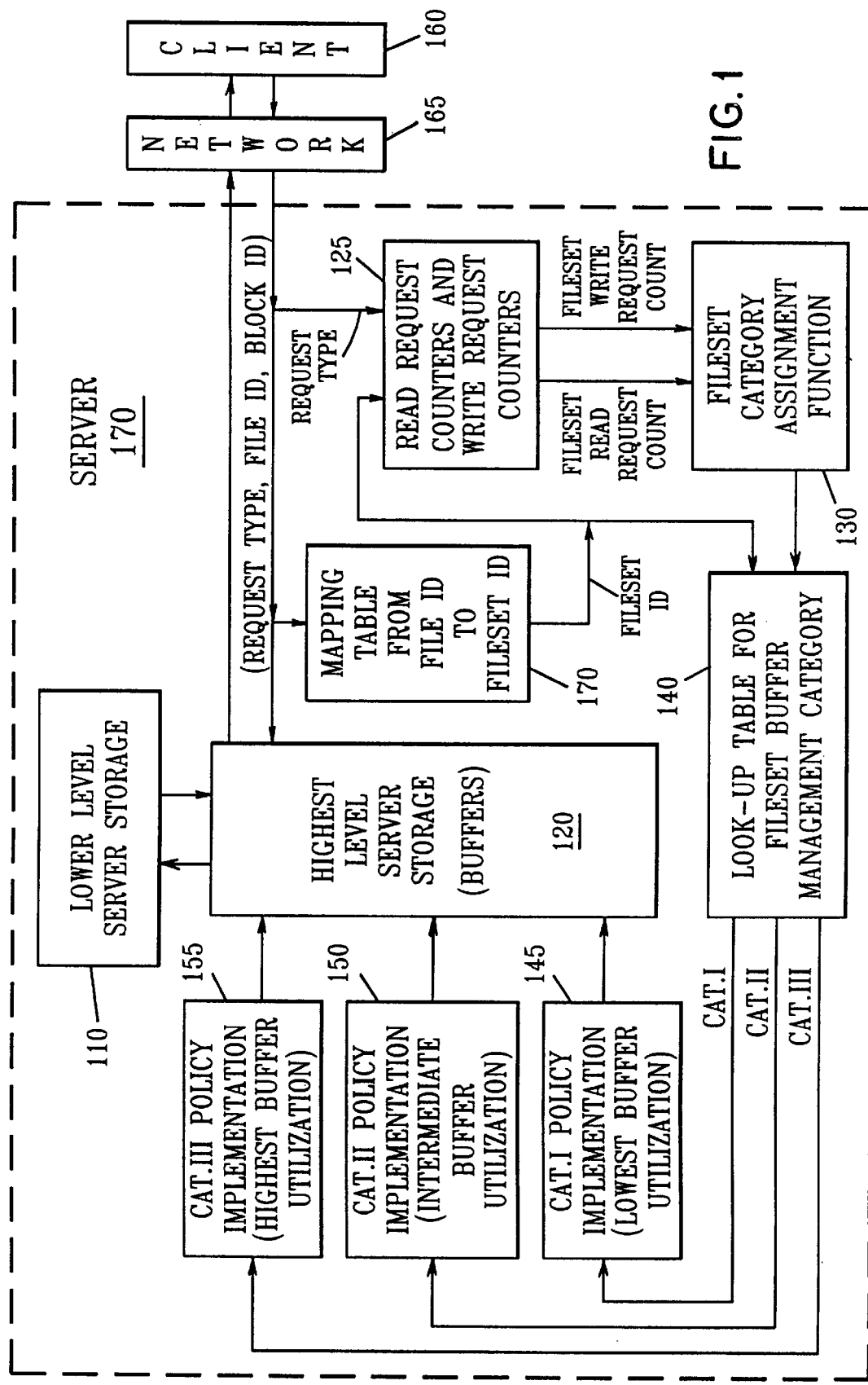
FIG. 1 is a block diagram of a fileserver buffer manager in a client-server environment in accordance with this invention.

FIG. 1 is a high level block diagram of a client-server system in which the present invention has been incorporated. A client 160 sends read and write requests over a network 165 to a server 170. It is assumed that read and write requests all include an address from which a File ID and Block ID can be obtained or derived in a conventional fashion. The server returns data on a read request from the higher level storage (i.e., buffers) 120 (and fetches it from a lower level storage 110, if required). On a write request, the server propagates the write to the lower level storage 110 through the higher level storage 120.

Fileset access operation statistics are collected by block 125. Preferably block 125 counts all read and write requests for each fileset. Periodically, the collected fileset access operation statistics (preferably the read and write counts for each fileset over a past time window) are used by block 130 to assign a fileset category to each fileset (or perhaps only to filesets which have been sufficiently active during a past time window). The current fileset category for each fileset is stored in a look-up table 140. It is possible for block 130 to only send changes to fileset category assignments (i.e., reassignments) to the look-up table 140 or perhaps all fileset category assignments having current fileset access operation statistics could be sent. The fileset category for a fileset with no current fileset access operation statistics could remain the same as it was when it last had current fileset access statistics or it could revert to a default fileset category. Periodically the read and write counts for each fileset may be reset to zero.

In FIG. 1, filesets are classified into three categories, called Category I, Category II and Category III. It should be understood, however, that there could be only two categories or more than three categories. Category I contains the filesets with a low buffer utilization need. Category II and Category III contain the filesets with intermediate and high buffer utilization requirements respectively. Files in Category I are managed in buffer storage in accordance with a first buffer management policy (called the Category I Policy), which provides a low buffer utilization characteristic for the files in this Category I. Files in Categories II and III are managed in buffer storage in accordance with a second and third buffer management policy (called the Category II Policy and Category III Policy respectively), which provide an intermediate and high buffer utilization characteristic for files in Category II and Category III respectively. The Category I Policy is implemented by block 145, while the Category II and Category III Policies are implemented by blocks 150 and 155 respectively.

On each file access request (read or write), the File ID for that request is sent to a mapping table 170, which determines the Fileset ID and sends it to the read and write counter block 125 and the look-up table 140. The look-up table 140 in turn determines which fileset category (I, II or III) corresponds to that Fileset ID and in turn applies the corresponding buffer management policy to the block covered by that access request by activating the corresponding block 145, 150 or 155. The Fileset ID alternatively could be provided by a client in a block request or might be directly derived from bits in a File ID (or even be the File ID itself).

The invention will now be described further with a detailed description of a generalized embodiment in which there are P categories of filesets and P buffer management policies which are implemented. P can be 3 (as in FIG. 1) or any other integer greater than 1. A server buffer of total size B is divided into P partitions. Each partition 230 through 240 is called a buffer pool ($pool_1$ to $pool_P$) and these buffer pools are generally of unequal size and are effectively managed separately. Each of these buffer pools is used to buffer (i.e., temporarily store) blocks of files in filesets that are assigned to a particular buffer management category. Relative buffer utilization levels may be controlled indirectly through control of the relative number of files that are assigned to each fileset (e.g., by block 130 in FIG. 1) and/or by the relative size of each buffer pool. These buffer pools and their directory 250 shown in FIG. 2 may be considered a more detailed view of the highest level server storage 120 shown in FIG. 1.

Table 310 in FIG. 3 implements the look-up table function 140 of FIG. 1. When a request is made from a client for a block access, the File ID in the request is used by table 170 (FIG. 1) to find the corresponding Fileset ID $F_i$, which is used in turn to find a specific entry 312 in table 310, which identifies the corresponding buffer pool management category (or particular buffer pool, ID $BP_i$ in this embodiment).

Figure 2:
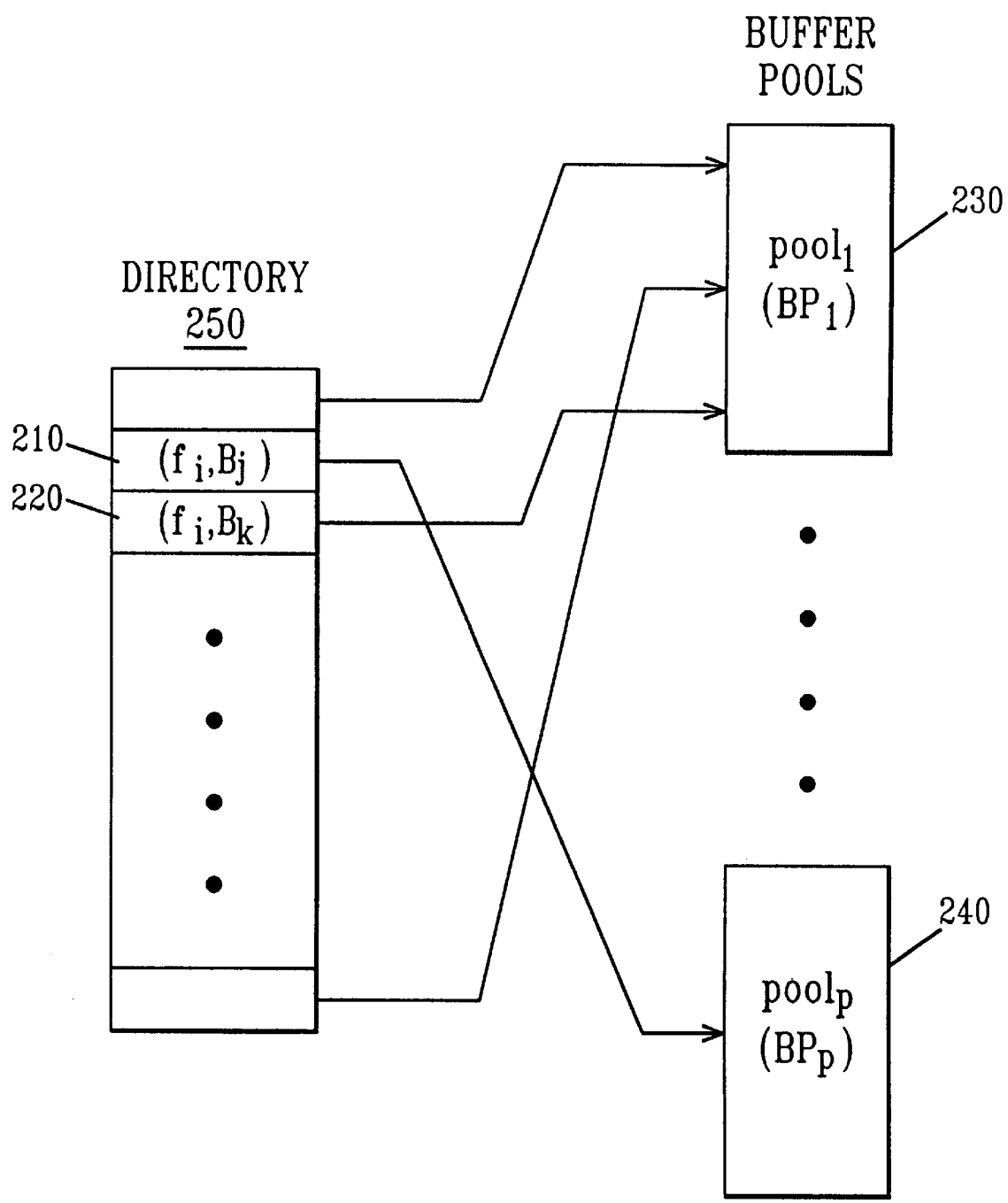
FIG. 2 illustrates a data block mapping to various buffer pools for active files.

The File ID $f_i$, and Block ID $B_j$ are used to access an entry in directory 250, which returns the address of the buffer frame containing the block specified in an incoming request. Note that the buffer pool assignment for each fileset changes dynamically, and hence, different blocks from the same fileset can reside in different buffer pools if the buffer pool assignment (i.e., buffer management category assignment) changes after one block has been buffered and before the other block is buffered. Directory entries 210 and 220 in FIG. 2 illustrate fileset blocks $B_j$ and $B_k$ of the same file $f_i$ [represented by ($f_i$, $B_j$) and ($f_i$, $B_k$)] map to buffer pools $pool_1$ and $pool_p$, respectively. However, the same fileset block is never replicated in multiple buffer pools. Therefore, all the buffer pools share the same directory for look up.

Table 310 also maintains the file access statistics for each fileset $F_i$, not only its current buffer pool assignment $BP_i$. For each fileset, table 310 maintains a read count $rc_i$, write count $wc_i$, and read ratio $rr_i$, as shown in block 310 in FIG. 3. So, in this embodiment, blocks 125 and 140 of FIG. 1 have been combined into one table 310, without any loss of generality. The read count or write count is updated after every access operation, whereas the current buffer pool assignment and read ratio are updated only periodically, as described in greater detail below. The buffer pool to which a fileset is assigned, i.e., the mapping function of block 130 in FIG. 1, depends upon its read ratio. The read ratio of a fileset is defined as the ratio of the number of read requests to the total (i.e., read+write) number of requests to this fileset during a past time window.

Figure 4:
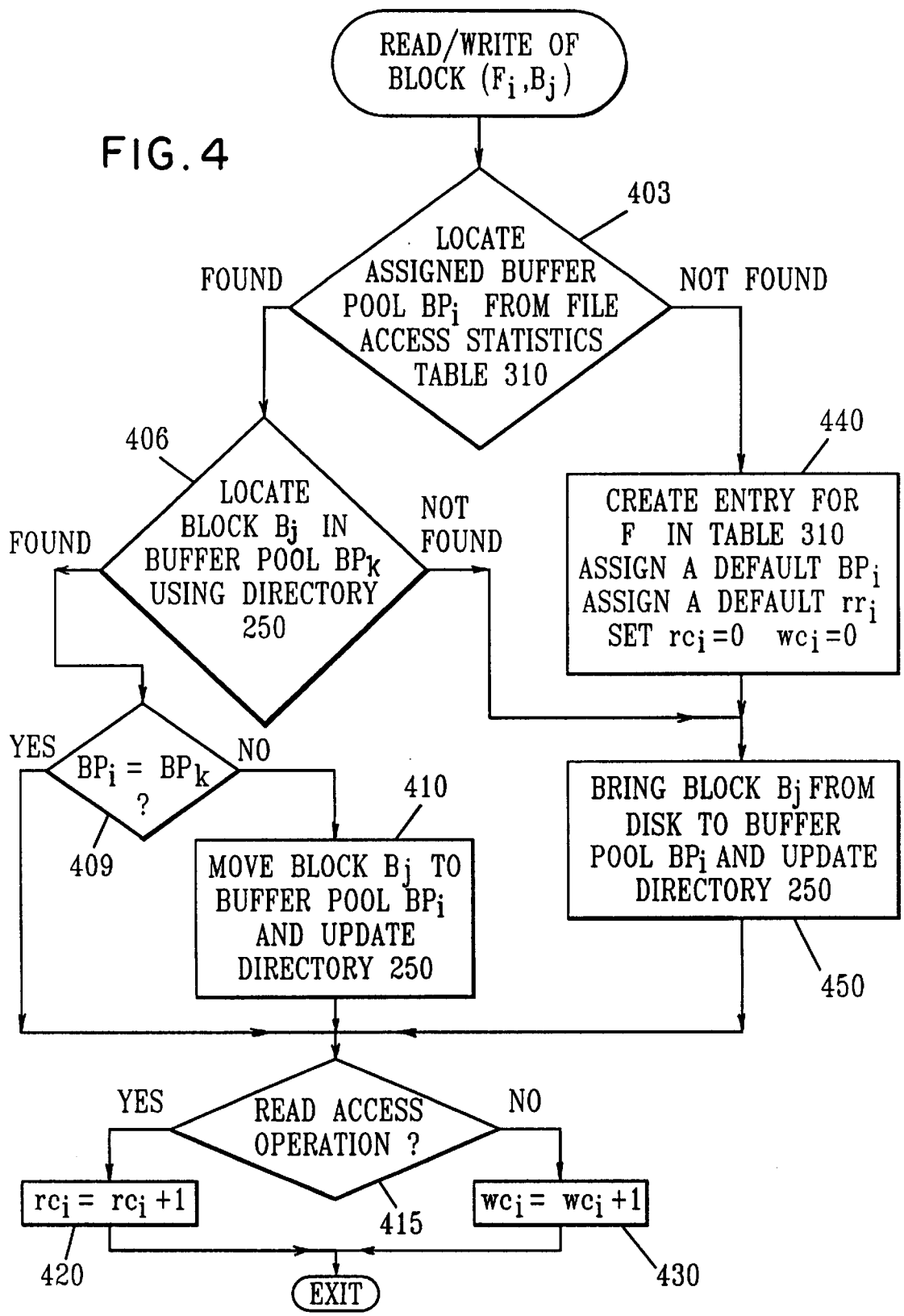
FIG. 4 is a high level flow diagram for gathering access statistics and maintaining blocks in the correct buffer pool.

Referring now to FIG. 4, on every read or write request to a block $B_j$ of a fileset $F_i$, the file access statistics table (table 310) is used first to obtain the current buffer pool assignment $BP_i$ for $F_i$ as shown in block 403. The fileserver then uses directory 250 to find the actual location of the desired block $B_j$ (as shown in block 406), including identification of the actual buffer pool $BP_k$ in which this block is located. The fileserver then checks (block 409) to see if the buffer pool $BP_k$ in which this block is actually located is the same buffer pool as the current buffer pool $BP_i$. If this block is not in $BP_i$, then the block is transferred from $BP_k$ to $BP_i$, as shown in block 410 in FIG. 4. This creates an empty (or invalid) location in buffer pool $BP_k$, which becomes the preferred location in buffer pool $BP_k$ to receive a new block. After the transfer, the directory is updated as shown in step 410 in FIG. 4. The fileserver then checks, as shown in step 415 in FIG. 4, whether the operation is a read access operation or a write access operation and increments the read or write counts as shown in blocks 420 and 430 of FIG. 4.

If the directory lookup in step 406 fails, i.e. the block is not found in a buffer pool, the fileserver brings the block in from disk and inserts it into the buffer pool $BP_i$, as shown in step 450 of FIG. 4 and updates the directory 250. It then updates the read and write counters via step 415 and either step 420 or step 430 of FIG. 4.

In this embodiment it is also possible for a fileset to not have an entry in the fileset access statistics table 310. This may happen, for example, if the file access statistics table 310 is smaller than the number of filesets and the fileset has not been accessed in the recent past. If there is no entry in the fileset access statistics table, the lookup in step 403 will fail. In this case, a new entry is created for that fileset by setting the value of $rr_i$ to some default value and setting the read and write counters to zero, as shown in block 440 of FIG. 4. The fileserver then proceeds to block 450 of FIG. 4 where the block is inserted into the buffer pool.

Figure 5:
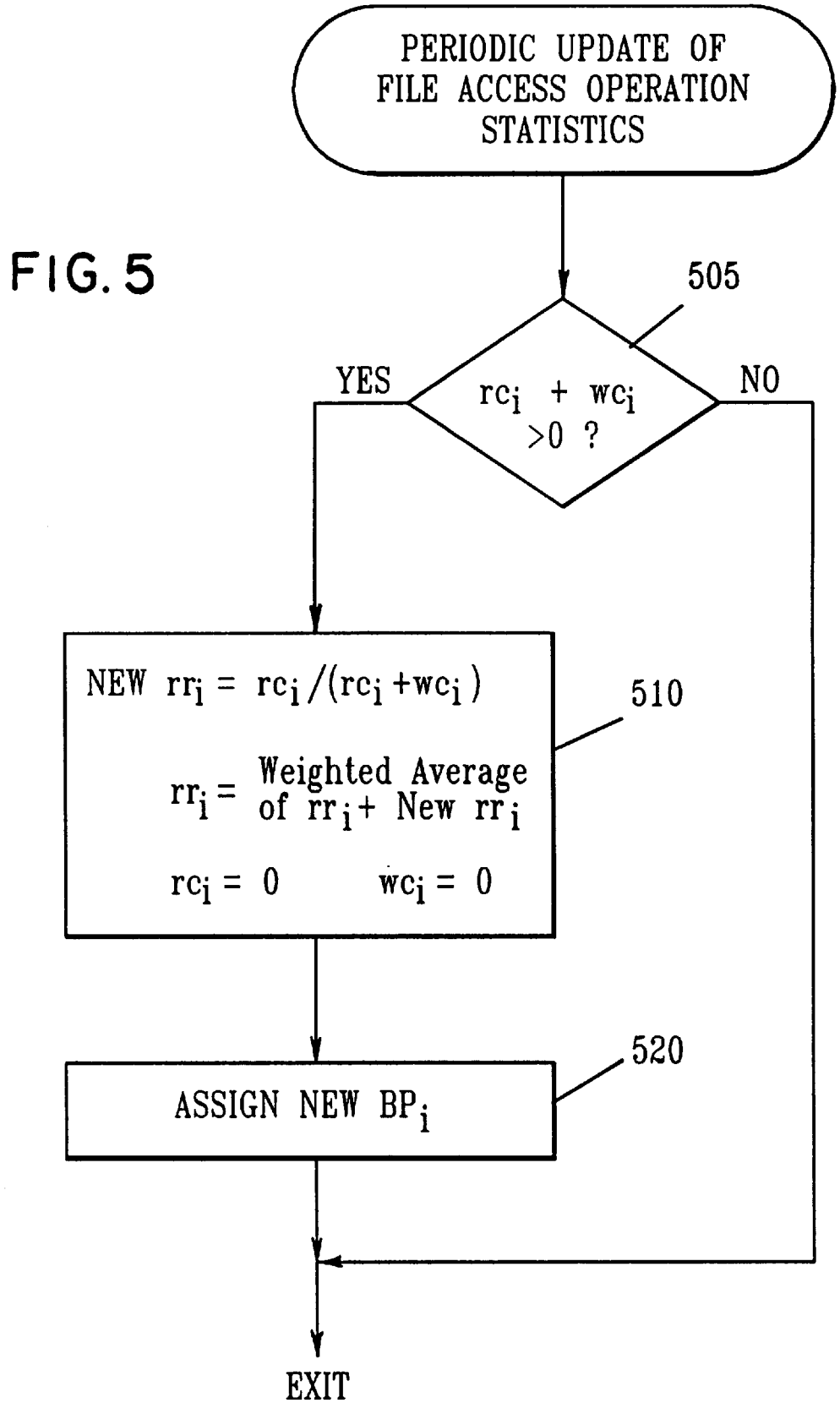
FIG. 5 is a high level flow diagram for periodically updating the read ratio and reassigning buffer pools.

The details of dynamic buffer pool assignment and read ratio estimation which are performed periodically will now be described briefly. The fileserver first checks to see if the fileset has been inactive in step 505 in FIG. 5, and exits if the fileset has been inactive. If not, the read ratios $rr_i$ are recomputed. As shown in block 510, the $rr_i$ that is computed and stored in table 310 may be a weighted average of the old $rr_i$ and a new read ratio. After each recomputation of read ratios, the buffer pools are reassigned in block 520 of FIG. 5. Mathematically this is done by letting $T_1$ through $T_P$ be predefined thresholds, such that $T_{i-1} < T_i$, for $1 \leq i \leq P$ and $T_P$ is one. Then $BP_i = j$ iff $j = 1$ and $0 \leq rr_i \leq T_1$ or, $j > 1$ and $T_{j-1} < rr_i \leq T_j$.

While the invention has been described in terms of a preferred embodiment, those skilled in the art will recognize that the invention can be practiced with modification within the spirit and scope of the appended claims.

What is claimed is:

1. In a client-server computer system in which a fileserver stores files and has memory buffers for caching portions of said files for more rapid access by clients, an improved method for managing said memory buffers, comprising the steps of:

grouping related files into filesets;

collecting fileserver access operation statistics for each of said filesets;

classifying said filesets into a plurality of fileset categories having similar collected access operation statistics;

effectively applying a different fileserver buffer management policy to files in each of said fileset categories; and wherein the fileserver buffer management policy effectively applied to each of said fileset categories creates a relatively higher preference for retaining in said memory buffer portions of files having collected fileserver access operation statistics corresponding to a relatively higher read-to-write ratio.

2. In a client-server computer system in which a fileserver stores files and has memory buffers for caching at least some portions of at least some of said files for more rapid access by clients, an improved buffer manager for said fileserver, comprising:

means for determining a fileserver read/write ratio for at least each of said files having a portion thereof stored in said memory buffers;

means for implementing a plurality of different buffer management policies, each said different buffer management policy corresponding to one of a plurality of separate ranges of possible read/write ratios and each possible read/write ratio falling within one of said separate ranges;

means responsive to said determined fileserver read/write ratios for assigning to at least each of said files having a portion thereof stored in said memory buffers the particular one of said buffer management policies that corresponds to the determined read/write ratio for said each file; and means for managing any portions of each file stored in said memory buffers in accordance with said particular one of said buffer management policies assigned to said each file.

3. An improved buffer manager as defined in claim 2 and further comprising means for grouping files into filesets, said means for determining a fileserver read/write ratio for any particular file including means for counting the number of read requests and counting the number of write requests to any file in said fileset of said particular file.

4. An improved buffer manager as defined in claim 3 wherein said means for determining a fileserver read/write ratio further includes means for computing the ratio of said counted number of read requests to the sum of said counted number of write requests and said counted number of read requests.

5. An improved buffer manager as defined in claim 3 wherein said means for counting resets to zero periodically.

6. An improved buffer manager as defined in claim 2 wherein said means implementing a plurality of different buffer management policies includes a means implementing partitioning of said memory buffers into a plurality of buffer pools and said means for assigning assigns a particular buffer pool to each of said files having a portion thereof stored in said memory buffers.

7. An improved buffer manager as defined in claim 6 wherein said means for managing is implemented by storing said any portions of said each file in said particular one of said buffer pools assigned to said each file.

8. An improved buffer manager as defined in claim 7 wherein said buffer pools are each managed with a same algorithm, but the relative size of each of said buffer pools is selected to make the average time that portions of files are resident in a buffer pool assigned to a file having a relatively high read/write ratio longer than the average time that portions of files are resident in a buffet pool assigned to a file having a relatively low read/write ratio.

9. An improved buffer manager as defined in claim 2 wherein said plurality of different buffer management policies are implemented with a single LRU stack by inserting entries into said stack at different positions for each of said different fileserver buffer management policies.

* * * * *